US009517676B2

(12) United States Patent
Schmierer

(10) Patent No.: US 9,517,676 B2
(45) Date of Patent: Dec. 13, 2016

(54) METHOD AND DEVICE FOR STABILIZING A VEHICLE AGAINST ROLLING MOVEMENTS

(71) Applicant: FORD GLOBAL TECHNOLOGIES, LLC, Dearborn, MI (US)

(72) Inventor: Ralf Schmierer, Cologne (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 14/332,199

(22) Filed: Jul. 15, 2014

(65) Prior Publication Data

US 2015/0014954 A1 Jan. 15, 2015

(30) Foreign Application Priority Data

Jul. 15, 2013 (DE) .......................... 10 2013 213 799

(51) Int. Cl.
*B60G 21/055* (2006.01)
*B60G 3/06* (2006.01)
(Continued)

(52) U.S. Cl.
CPC ............... *B60G 21/055* (2013.01); *B60G 3/06* (2013.01); *B60G 7/001* (2013.01); *F16F 7/1005* (2013.01);
(Continued)

(58) Field of Classification Search
CPC .................... B60G 21/055; B60G 2204/1224; B60G 2206/11; B62D 7/20
(Continued)

(56) References Cited

U.S. PATENT DOCUMENTS 1,988,830 A * 1/1935 Buckwalter ............. F16C 7/023
74/579 R
4,066,278 A * 1/1978 Takagi ................... B60G 15/02
188/312
(Continued)

FOREIGN PATENT DOCUMENTS

DE    11 38 646 A    4/1957
DE    26 01 212 A1   2/1977
(Continued)

OTHER PUBLICATIONS

Forthaus et al., Stabilizer strut body for mechanically connecting stabilizer and wheel suspension at two points, has three elevations provided above horizontal axis of profile cross section and two elevations provided below horizontal axis, German Patent Office, DE 10 2009 031 289 A1, Machine Translation of Description.*
(Continued)

*Primary Examiner* — James English
(74) *Attorney, Agent, or Firm* — Jones Robb, PLLC; Raymond L. Coppiellie

(57) ABSTRACT

An anti-rolling stabilizer for a motor vehicle is provided. The stabilizer includes a U-shaped torsion bar having an elongated base and two free ends. The elongated base is coupled to a vehicle frame and each of the free ends is coupled to one of a right-hand and a left-hand wheel-guiding element via a respective coupling bar. Each of the coupling bars includes an NVH vibration absorber configured to counteract vibrations of the respective coupling bar or of the respective wheel guiding element to which the coupling bar is configured to connect, wherein the NVH absorber counteracts vibrations in one or more predetermined frequency ranges without counteracting vibrations in other frequencies.

10 Claims, 2 Drawing Sheets

(51) Int. Cl.
    *B60G 7/00*     (2006.01)
    *F16F 7/10*     (2006.01)
    *F16F 7/116*    (2006.01)

(52) U.S. Cl.
    CPC ......... *F16F 7/116* (2013.01); *B60G 2200/142* (2013.01); *B60G 2204/1224* (2013.01); *B60G 2206/11* (2013.01)

(58) Field of Classification Search
    USPC ........................................ 280/124.106, 93.51
    See application file for complete search history.

(56) References Cited

U.S. PATENT DOCUMENTS

| | | | | |
|---|---|---|---|---|
| 4,458,915 A * | 7/1984 | Emery | .................... | B60G 3/202 |
| | | | | 280/124.146 |
| 5,062,656 A * | 11/1991 | Hynds | ................ | B60G 21/0551 |
| | | | | 267/160 |
| 5,064,216 A * | 11/1991 | Hynds | .................... | B60G 11/20 |
| | | | | 280/124.152 |
| 5,217,245 A | 6/1993 | Guy | | |
| 5,352,059 A * | 10/1994 | Ueno | .................... | B60G 7/001 |
| | | | | 280/124.152 |
| 5,398,907 A * | 3/1995 | Kelchner | .............. | F16L 55/035 |
| | | | | 248/60 |
| 5,702,121 A * | 12/1997 | Song | .................. | B60G 21/0551 |
| | | | | 280/124.1 |
| 5,836,598 A * | 11/1998 | Parker | .................... | B60G 21/05 |
| | | | | 280/124.106 |
| 6,007,079 A * | 12/1999 | Kincaid | ................. | B60G 7/005 |
| | | | | 280/124.106 |
| 6,113,058 A * | 9/2000 | Iwasaki | .................... | B60G 7/001 |
| | | | | 248/678 |
| 6,254,114 B1 * | 7/2001 | Pulling | ................. | B60G 7/005 |
| | | | | 280/93.511 |
| 6,401,628 B1 * | 6/2002 | Sebata | .................. | B60G 7/001 |
| | | | | 105/176 |
| 6,402,171 B1 * | 6/2002 | Nickerson | .............. | B60G 11/20 |
| | | | | 280/124.106 |
| 6,481,732 B1 * | 11/2002 | Hawkins | ............ | B60G 17/0162 |
| | | | | 280/124.106 |
| 6,604,270 B2 * | 8/2003 | Kincaid | ................. | B60G 7/005 |
| | | | | 280/124.152 |
| 6,688,618 B2 | 2/2004 | Schmidt et al. | | |
| 7,648,149 B2 * | 1/2010 | Ryberg | .................... | B60G 9/00 |
| | | | | 280/124.106 |
| 7,887,072 B2 * | 2/2011 | Hauser | ................. | B60G 17/005 |
| | | | | 280/124.107 |
| 8,376,647 B2 * | 2/2013 | Kuroda | .................. | B60G 7/001 |
| | | | | 403/134 |
| 2002/0102126 A1 * | 8/2002 | Kincaid | ................. | B60G 7/005 |
| | | | | 403/133 |
| 2003/0034624 A1 | 2/2003 | Schmidt et al. | | |
| 2006/0012090 A1 * | 1/2006 | Cerri | ...................... | B60G 7/001 |
| | | | | 267/140.11 |
| 2009/0020972 A1 * | 1/2009 | Tatsumi | ............... | B62D 25/088 |
| | | | | 280/124.1 |
| 2009/0179397 A1 * | 7/2009 | Lorenzon | ............... | B60G 11/52 |
| | | | | 280/124.106 |

FOREIGN PATENT DOCUMENTS

| | | | | |
|---|---|---|---|---|
| DE | 102 32 438 B4 | 2/2004 | | |
| DE | 42 93 010 B4 | 12/2006 | | |
| DE | 10 2006 057 891 A1 | 6/2008 | | |
| DE | 102009031289 A1 * | 1/2011 | ............ | B60G 7/001 |
| DE | 10 2009 037 084 A1 | 2/2011 | | |
| DE | 10 2011 018 751 A1 | 10/2012 | | |
| DE | 10 2011 112 714 A1 | 3/2013 | | |
| EP | 0 933 240 A1 | 8/1999 | | |
| FR | 1134998 | 4/1957 | | |
| JP | 03-186424 A | 8/1991 | | |
| JP | 03-227713 A | 8/1991 | | |
| JP | 2005-106293 A | 4/2005 | | |
| JP | 2010-216494 A | 9/2010 | | |
| KR | 10-0829299 B1 | 5/2008 | | |

OTHER PUBLICATIONS

Examination Report dated Mar. 14, 2014 from German Patent Application No. 10 2013 213 799.0.

* cited by examiner

METHOD AND DEVICE FOR STABILIZING A VEHICLE AGAINST ROLLING MOVEMENTS

CROSS REFERENCE TO RELATED APPLICATIONS

This application claims priority to German Application No. 102013213799.0, filed on Jul. 15, 2013, the entire content of which is incorporated by reference herein.

TECHNICAL FIELD

The present disclosure relates generally to a device and method for noise reduction in a stabilizer for motor vehicles.

BACKGROUND

Conventional stabilizing systems used to counteract rolling of a motor vehicle, such as a lateral stabilizer or a rolling stabilizer, include a U-shaped torsion bar, the elongated base of which is coupled to a vehicle frame. Each of the ends of the U-shaped torsion bar is connected, via a coupling bar, to a wheel guiding element. Examples of such conventional stabilizing systems may be found, for example, in DE 10 2006 057 891 A1, DE 10 2009 037 084 A1, and DE 42 93 010 B4. These systems may include damping systems, such as rotation dampers or piston-cylinder arrangement. However, while such conventional systems improve stabilization, and may damp rolling movements or set suspension stiffness, they may introduce interference noise and vibration into the vehicle, commonly referred to as NVH (noise, vibration, harshness), for example NVH vibrations that originate from wheel guiding elements.

Conventional damping mechanisms used with vehicle suspensions and stabilization systems, such as the rotation dampers and the piston-cylinder arrangements noted above do not permit NVH reduction. Thus, there is a need for a noise reduction device for use in anti-roll and/or stabilization systems.

SUMMARY

In accordance with various exemplary embodiments, the present disclosure provides a device for stabilizing a motor vehicle against rolling movements. The device comprises a U-shaped torsion bar having an elongated base and two free ends, wherein the elongated base is coupled to a vehicle frame. The device also comprises a first coupling bar and a second coupling bar. Each of the coupling bars is configured to connect one of the free ends of the U-shaped torsion bar to one of a right-hand and a left-hand wheel guiding element. Each of the coupling bars includes an NVH vibration absorber configured to counteract vibrations of the respective coupling bar or of the respective wheel guiding element to which the coupling bar is configured to connect. The NVH absorber is configured to counteract vibrations in one or more predetermined frequency ranges without counteracting vibrations in other frequencies.

In accordance with another aspect of the present disclosure, a method for stabilizing a motor vehicle against rolling movements by means of a U-shaped torsion bar, an elongated base of which is coupled to a vehicle frame and free ends of which are each connected via a respective coupling bar to a right-hand or a left-hand wheel guiding element, is provided. The method comprises tuning a first vibration absorber configured to be mounted to a first of the coupling bars to counteract vibrations of the first coupling bar or of the wheel guiding element connected to the first coupling bar in one or more predetermined frequency ranges, and tuning a second vibration absorber configured to be mounted to a second of the coupling bars to counteract vibrations of the second coupling bar or of the wheel guiding element connected to the second coupling bar in one or more predetermined frequency ranges.

In accordance with another aspect of the present disclosure, an anti-rolling stabilizer for a motor vehicle comprises a U-shaped torsion bar having an elongated base and two free ends, wherein the elongated base is coupled to a vehicle frame, and first and second coupling bars, each coupling bar connecting one of the free ends to a respective wheel-guiding element. Each of the coupling bars is a substantially rigid connecting bar having a substantially elongate central portion. A NVH vibration absorber is mounted on the central portion of each coupling bar, and each NVH vibration absorber is configured to counteract vibrations of the coupling bar on which the absorber is mounted and/or to counteract vibrations of the respective wheel guiding element in one or more predetermined frequency ranges, without counteracting vibrations in other frequencies.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 4:
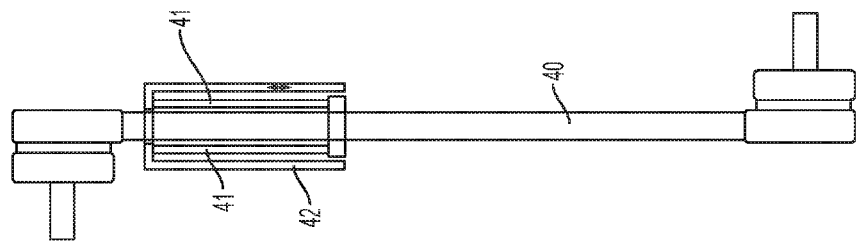
FIG. 4 is a side view of a stabilizer coupling bar with a vibration absorber in the form of piezoelectrically actuated moving mass, the vibration absorber being illustrated in cross section.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure. It should be noted that the features set out individually in the following description can be combined with each other in any technically advantageous manner and set out other embodiments of the present disclosure.

The present disclosure relates to a device and to a method for stabilizing a motor vehicle against rolling movements by means of a lateral stabilizer or a rolling stabilizer containing a U-shaped torsion bar. The U-shaped torsion bar has an elongated base which is coupled to the vehicle frame parallel to a wheel axle. The ends of the U-shaped torsion bar are connected, each via a coupling bar, to a right-hand and a left-hand wheel guiding element of the right-hand and left-hand wheel suspension system. The stabilizer therefore connects opposite wheels in such a way that when a wheel experiences spring compression the opposite wheel also experiences a certain degree of spring compression, in order to counteract rolling of the vehicle body when cornering.

Conventional damping mechanisms used with stabilizers do not permit NVH reduction because NVH vibrations which originate from the wheel guiding elements, with their typical frequencies of for example several tens or hundreds of Hz, cannot reach the rotation damper at all and, instead, are lost in the relatively long rotationally elastic torsion bar. Alternatively, in systems that use a piston-cylinder arrangement, such an arrangement is configured to set the suspension roll stiffness, and tends not to be vibration-damping and does not act in a frequency-selective fashion.

In accordance with the present disclosure, coupling bars of the stabilizer each include an NVH vibration absorber which is configured to counteract vibrations of the coupling bar or of the wheel guiding element connected thereto in one or more predetermined frequency ranges, but not at other frequencies. Thus, in a stabilizer system in accordance with the present teachings, each coupling bar may include an NVH vibration absorber tuned to counteract one or more predetermined frequency ranges.

A vibration absorber is a type of vibration damper which, in contrast to conventional vibration dampers, is not attached between two objects but instead is connected or attached to only one object. Vibration absorbers damp only specific vibration frequencies by means of a vibrating mass, while conventional vibration dampers act essentially independently of frequency. A vibration absorber is tuned in such a way that it resonates at a previously defined frequency and, as a result, counteracts resonant vehicle vibrations. Thus, the inclusion of vibration absorbers with the coupling bars permits the stabilizer system to be tuned to counteract vibrations introduced into the system by, for example, the wheel guiding element or by the coupling bars.

In accordance with the present teachings, vibration absorbers that are incorporated into stabilizer coupling bars can be easily manufactured, mounted and accommodated. In particular, there is no need for any modification to the wheel suspension system, or to the coupling bar itself. Vibration absorbers can be attached easily to coupling bars, for example by clamping or welding. However, even if the coupling bar were to be configured specially for attachment of the vibration absorber, such a modification may be made easily and in a manner that would reduce the overall weight of the system as compared to other known noise reduction systems, for example those used for suspension systems, such as those that require configuring an axle stub or a spring strut for this purpose.

Additionally, in the field of stabilizer coupling bars, there is normally a large amount of space available where a vibration absorber is not destructive and does not limit the functionality of the coupling bar in any way.

In accordance with the present teachings, the coupling bar may be a substantially rigid connecting bar having a rigid elongate central portion. The vibration absorber may be directly connected to the elongate central portion of the coupling bar.

A stabilizer coupling bar, provided with a vibration absorber, forms an integral component which can be easily manufactured in a large number of various embodiments which differ, for example, in their resonant frequencies, weights, and/or working principles. Additionally, these integral components (coupling bar and vibration absorber) can be easily mounted or replaced. Due to the ease of manufacture and use, a large number of different motor vehicles can be easily equipped with a suitable NVH reduction means without having to modify any complex components for this purpose.

A stabilizer including coupling bars provided with vibration absorbers in accordance with the present teachings is particularly suitable for use in MacPherson wheel suspension systems and, in particular, MacPherson front wheel suspension systems, wherein a coupling bar with a vibration absorber is provided for a right-hand and a left-hand wheel suspension system, respectively.

In accordance with one aspect of the present disclosure, the vibration absorbers can be passive vibration absorbers. For example, the vibration absorber may be a vibrating mass in the form of an elongated elastic lip or fin, one longitudinal edge of which is attached to the corresponding coupling bar. Alternatively, for example, the vibration absorber may include one or more elongate blocks which are attached to the corresponding coupling bar by means of elastic elements.

In accordance with another aspect of the present disclosure, the vibration absorbers can be active vibration absorbers. Such active vibration absorbers may be, for example, switched on and off if necessary. An active vibration absorber may include, for example, a vibrating mass connected to the corresponding coupling bar by an electrically activated actuator, such as, for example, an electromagnetic actuator or a piezoelectric actuator.

Alternatively, any other methods for vibration absorption can be used.

Turning to the figures, FIGS. 1-4 each show an elongated coupling bar to be used in a stabilizer for a right-hand and a left-hand wheel suspension system of a motor vehicle in accordance with the present teachings. Referring to FIG. 5, the stabilizer 100 includes a U-shaped torsion bar 102 whose elongated base 104 is coupled to the vehicle frame 106 parallel to a wheel axle (not shown), and whose free ends 108 (only one free end 108 shown in FIG. 5) are connected, via coupling bars 110, to respective right-hand and left-hand wheel guiding elements (e.g., a portion of a McPherson strut 112, only one of which is shown in FIG. 5). Each coupling bar 110 is provided at each of its ends with a threaded bolt for connecting to a respective one of the wheel guiding element and the torsion bar 102. Each coupling bar 110 has on its shaft a respective vibration absorber 114, as is described below.

Figure 1:
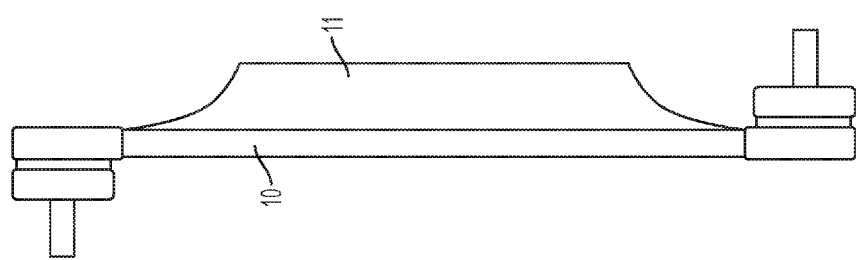
FIG. 1 is a side view of a first embodiment of a passive vibration absorber including a stabilizer coupling bar with an elastic lip or fin.

FIG. 1 shows a first embodiment of a coupling bar in accordance with the present disclosure. Coupling bar 10 contains a slit which runs along its length and in which an elongated lip or fin 11 is attached. The elongated lip or fin 11 may be made, for example, of rubber or may comprise a stiffer material than rubber, for example, a spring steel sheet. The lip or fin 11 acts as a passive vibration absorber. The slit in the coupling bar 10 can be formed, for example, by the shaft of the coupling bar 10 being manufactured from a U profile. The lip or fin 11 also may be formed as a single piece with the coupling bar 10 by correspondingly lengthening one edge of the shaft of the coupling bar 10 and at the same time tapering it in order to construct a vibrating lug which is narrow.

Figure 2:
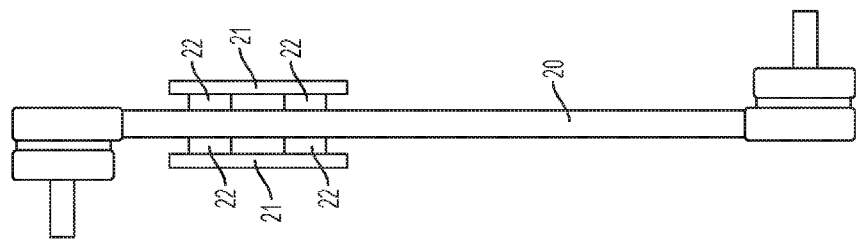
FIG. 2 is a side view of a second embodiment of a passive vibration absorber including a stabilizer coupling bar with two blocks elastically attached.

FIG. 2 shows a second embodiment of a coupling bar in accordance with the present disclosure. As shown in FIG. 1, two elongate blocks 21, which form absorber masses, are attached to a coupling bar 20 by means of rubber elements 22. As shown, the coupling bar 20 is located precisely between the two blocks 21; however, the blocks 21 do not have to be arranged in a rotationally symmetrical fashion about the coupling bar 20. For example, the blocks 21 may be at an angular interval from one another of less than 180° with respect to the longitudinal axis of the coupling bar 20 and/or be attached to the coupling bar 20 at different heights. In addition, blocks 21 need not be identical and may, for example, have different weights. It is also possible for just one block 21 or more than two blocks 21 to be provided. As a result, many possibilities are obtained for setting one or more predetermined frequency ranges in which the vibration absorbers which are formed by the blocks 21 and rubber elements 22 are effective.

Figure 3:
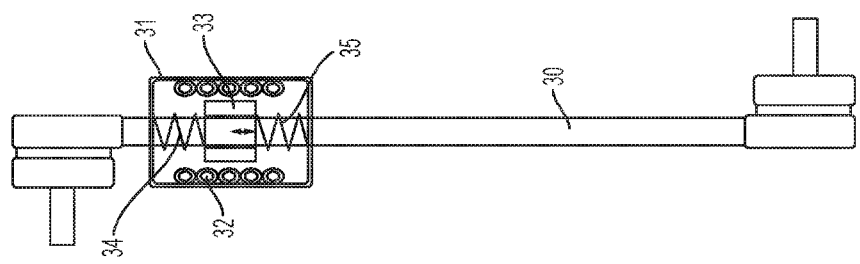
FIG. 3 is a side view of a stabilizer coupling bar with a vibration absorber in the form of an electromagnetically actuated moving mass, the vibration absorber being illustrated in cross section.

FIG. 3 shows another embodiment of a coupling bar in accordance with the present disclosure. As shown in FIG. 3, a portion of coupling bar 30 is surrounded by a housing 31. Housing 31 contains an annular magnet 33 which surrounds the coupling bar 30 and is mounted so as to be movable along the coupling bar 30. The annular magnet 33 is pre-stressed into a central position by means of springs 34, 35. Housing 31 also contains a coil 32. The annular magnet 33 forms an absorber mass and can move upward or downward counter to the spring force, as is indicated with a double-ended arrow, when an electric current flows through the coil 32. Alternatively, a vibration absorber which is formed by the housing 31, the coil 32 and the magnet 33 can be attached laterally to the coupling bar 30.

Figure 5:
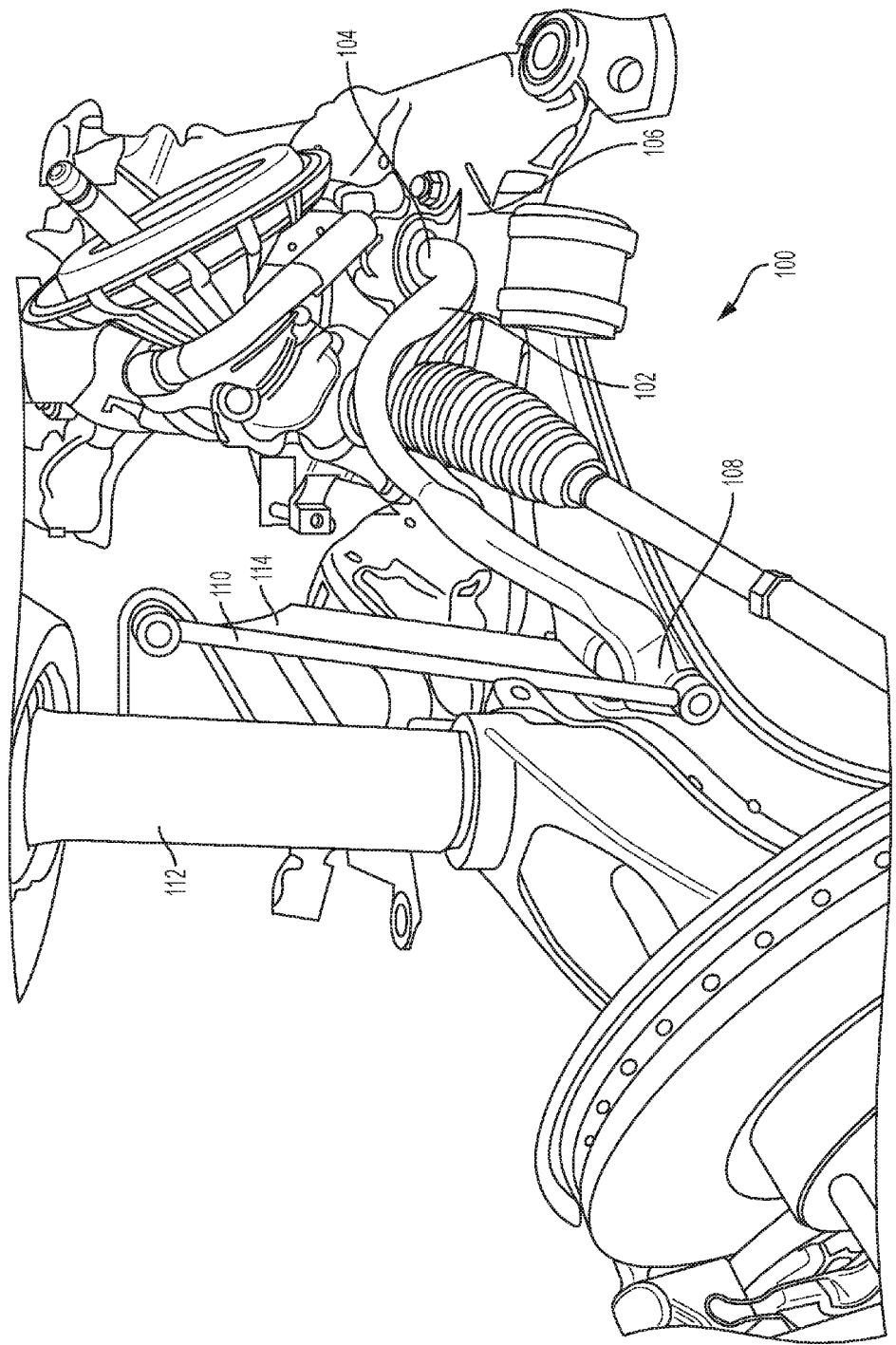
FIG. 5 is a perspective view of a device for stabilizing a motor vehicle against rolling movements including a coupling bar according to the disclosure.

FIG. 4 shows an additional embodiment of a coupling bar in accordance with the present disclosure. As shown in FIG. 4, a portion of a coupling bar 40 is surrounded by a hollow-cylindrical absorber mass 42. Absorber mass 42 can be moved upward or downward with respect to the coupling bar 40 by one or more piezoelectric actuators 41 as indicated by the double-ended arrow, when an electric voltage is applied to thereto. For example, a plurality of bar-shaped piezoelectric actuators 41 may be attached to coupling bar 40 or, alternatively, a single annular piezoelectric actuator 41 may be attached to the coupling bar 40.

The electric currents or voltages for actuating the vibration absorbers in FIGS. 3 and 4 can be generated, for example, by virtue of the fact that movements of the coupling bar or of the wheel guiding element connected thereto are sensed and currents or voltages with which the absorber masses are moved in opposite directions are generated on the basis of the measured values, in order to damp or compensate the vibrations.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a spring" includes two or more different springs. As used herein, the term "include" and its grammatical variants are intended to be non-limiting, such that recitation of items in a list is not to the exclusion of other like items that can be substituted or added to the listed items.

Further modifications and alternative embodiments will be apparent to those of ordinary skill in the art in view of the disclosure herein. For example, the systems may include additional components that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

What is claimed is:

1. A method for stabilizing a motor vehicle against rolling movements by means of a U-shaped torsion bar, an elongated base of which is coupled to a vehicle frame and free ends of which are each connected via a respective coupling bar to a right-hand or a left-hand wheel guiding element, comprising:

tuning a first vibration absorber configured to be mounted to a first of the coupling bars to counteract vibrations of the first coupling bar or of the wheel guiding element connected to the first coupling bar in one or more predetermined frequency ranges;

attaching the first vibration absorber to the first coupling bar such that the first vibration absorber and the first coupling bar vibrate as a unitary mass;

tuning a second vibration absorber configured to be mounted to a second of the coupling bars to counteract vibrations of the second coupling bar or of the wheel guiding element connected to the second coupling bar in one or more predetermined frequency ranges; and attaching the second vibration absorber to the second coupling bar such that the second vibration absorber and the second coupling bar vibrate as a second unitary mass.

2. The method of claim 1, wherein at least one of attaching the first vibration absorber to the first coupling bar and attaching the second vibration absorber to the second coupling bar comprises attaching at least one of a first and second passive vibration absorber to a respective one of the first coupling bar and the second coupling bar.

3. The method of claim 1, wherein attaching the first vibration absorber to the first coupling bar comprises attaching a longitudinal edge of a first elongated fin to the first coupling bar.

4. The method of claim 3, wherein attaching the second vibration absorber to the second coupling bar comprises attaching a longitudinal edge of a second elongated fin to the second coupling bar.

5. The method of claim 1, wherein at least one of attaching the first vibration absorber to the first coupling bar and attaching the second vibration absorber to the second coupling bar comprises directly mounting the at least one of the first vibration absorber and the second vibration absorber to a respective one of the first coupling bar and the second coupling bar.

6. The method of claim 1, wherein at least one of attaching the first vibration absorber to the first coupling bar and attaching the second vibration absorber to the second coupling bar comprises mounting the at least one of the first vibration absorber and the second vibration absorber to a rigid, elongate, central portion of a respective one of the first coupling bar and the second coupling bar.

7. A coupling bar for a vehicle suspension, comprising:
a vibration absorber comprising a fin extending from a longitudinal groove of the coupling bar between first and second ends of the coupling bar, wherein the fin has a height in a plane passing through a longitudinal axis of the coupling bar and a width normal to the height, and wherein the height is greater than the width.

8. The coupling bar of claim 7, wherein the vibration absorber is configured to vibrate with the coupling bar as a unitary mass.

9. The coupling bar of claim 7, wherein the vibration absorber is directly attached to the coupling bar.

10. The coupling bar of claim 7, wherein the vibration absorber is formed integrally with the coupling bar.

* * * * *